Dec. 22, 1970   J. M. VALDESPINO   3,548,421
INCINERATOR TOILET

Filed Oct. 16, 1969   2 Sheets-Sheet 1

INVENTOR
JOE M. VALDESPINO

BY
ATTORNEY

Dec. 22, 1970   J. M. VALDESPINO   3,548,421
INCINERATOR TOILET
Filed Oct. 16, 1969   2 Sheets-Sheet 2

INVENTOR
JOE M. VALDESPINO

BY
ATTORNEY

United States Patent Office 3,548,421
Patented Dec. 22, 1970

3,548,421
INCINERATOR TOILET
Joe M. Valdespino, Orlando, Fla., assignor to Tekmar Corporation, New York, N.Y.
Filed Oct. 16, 1969, Ser. No. 866,810
Int. Cl. A47k 11/02
U.S. Cl. 4—131
12 Claims

ABSTRACT OF THE DISCLOSURE

Apparatus for disposing of solid and liquid waste matter including means for separating the liquid matter from the solid matter, for comminuting and burning the solid waste matter, and for treating and discharging the liquid waste matter from the apparatus. The apparatus has means for producing and confining a flame substantially to an area around the inner wall of a combustion chamber to incinerate the comminuted solid matter, and means for chemically treating the waste liquid prior to discharge.

BACKGROUND OF THE INVENTION

(1) Field of the invention

This invention relates generally to sanitation and waste disposal and relates particularly to toilets having means for disposing of both solid and liquid waste matter.

(2) Description of the prior art

Many efforts have been made to provide for disposal of waste matter including by chemical treatment and decomposition and by subjecting the matter to heat from an open flame or an electric heating element. However, these prior devices have not been satisfactory due to the excessive bulk or mass, difficulty of transporting, and particularly the inefficiency of operation which resulted in an extended length of time for treating the waste matter, as well as offensive odors and the attracting of insects and the like. Specifically, the prior art devices which incinerated solid waste matter in bulk form would create a crust on the outer surface of the matter which insulated the core and necessitated extended periods of burning to dispose of the matter.

SUMMARY OF THE INVENTION

The present invention is an incinerator toilet including a generally cylindrical combustion chamber having a comminuting plate therein for reducing solid waste matter to relatively small particulate size and providing means for incinerating such waste matter by an open flame generally confined to an area around the inner wall of the combustion chamber. The apparatus also includes an auxiliary tank or sump for receiving liquid waste matter and chemically treating such liquid waste by the addition of chlorine or other neutralizing agents which destroy the bacteria in the liquid waste after which the liquid is discharged from the apparatus.

It is an object of the invention to provide a relatively simple, practical toilet having means for comminuting and incinerating solid waste matter and means for chemically treating liquid waste matter in a minimum of time, as well as to provide a toilet which can be readily manufactured and quickly installed by unskilled persons.

Another object of the invention is to provide an incinerator toilet having a generally cylindrical combustion chamber in which a burning mixture of fuel and air is introduced substantially tangentially under pressure in a manner that the flame is confined to the wall area and solid waste matter entering such combustion chamber is directed to the wall area where the flame is confined.

DESCRIPTION OF THE PREFERRED EMBODIMENT

Figure 1:
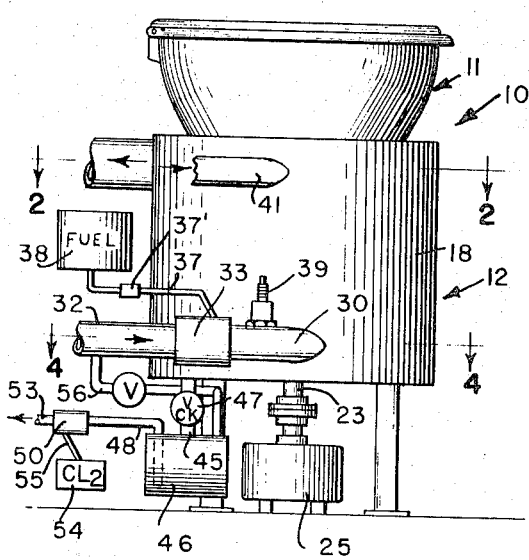
FIG. 1 is a side elevation of the device.
Figure 4:
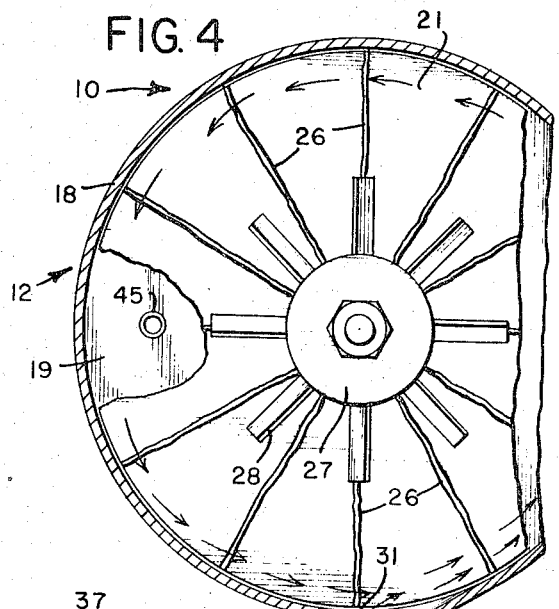
FIG. 4 is an enlarged fragmentary section on the line 4—4 of FIG. 1.
Figure 2:
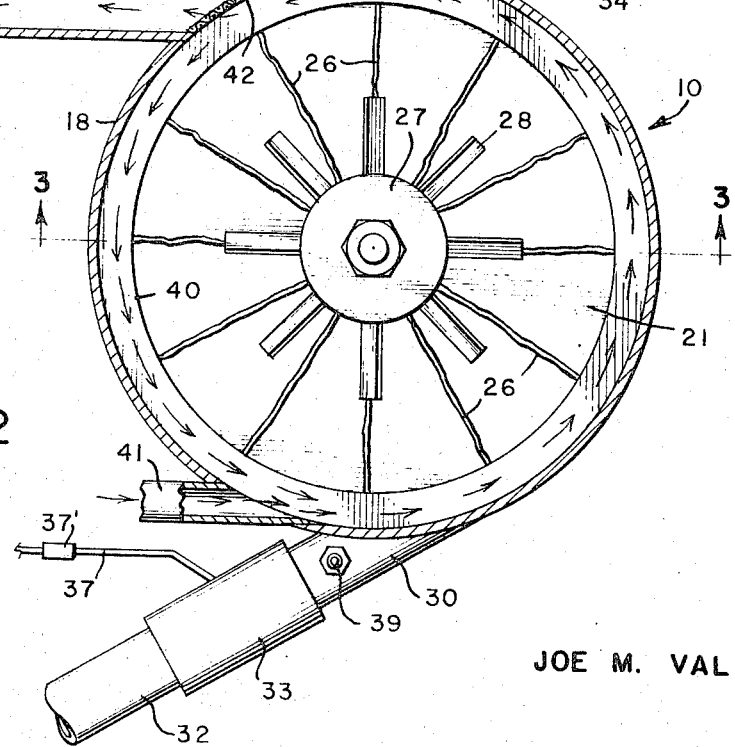
FIG. 2 is an enlarged section on the line 2—2 of FIG. 1.

With continued reference to the drawings, a water closet or toilet 10 is provided having an upper compartment 11 and a lower compartment or combustion chamber 12. The upper compartment is generally of inverted frusto-conical configuration having the larger end uppermost and the smaller end in communication with the lower compartment 12 through an opening 13. A seat 14 is provided at the top of the upper compartment, and such seat is hingedly mounted to one side of such compartment by means of a pivot 15. The seat 14 usually has a central opening 16 adapted to be closed by a cover or lid 17 hingedly mounted on the pivot 15.

The lower compartment 12 includes a generally cylindrical side wall 18 closed at one end by a bottom wall 19 and having a ring or upper wall 20 connecting the side wall 18 to the upper compartment 11 and defining a hollow combustion chamber. Adjacent to the bottom wall 19 a generally circular grinding or comminuting plate or disk 21 is provided having a diameter slightly less than the inner periphery of the side wall 18. The disk 21 includes a hub 22 fixed to a shaft 23 in any desired manner, as by a pin 24 in such a position that the disk is spaced slightly above the bottom wall 19. The shaft 23 is driven by a motor 25 to cause high speed rotation of the disk within the lower compartment 12.

Figure 3:
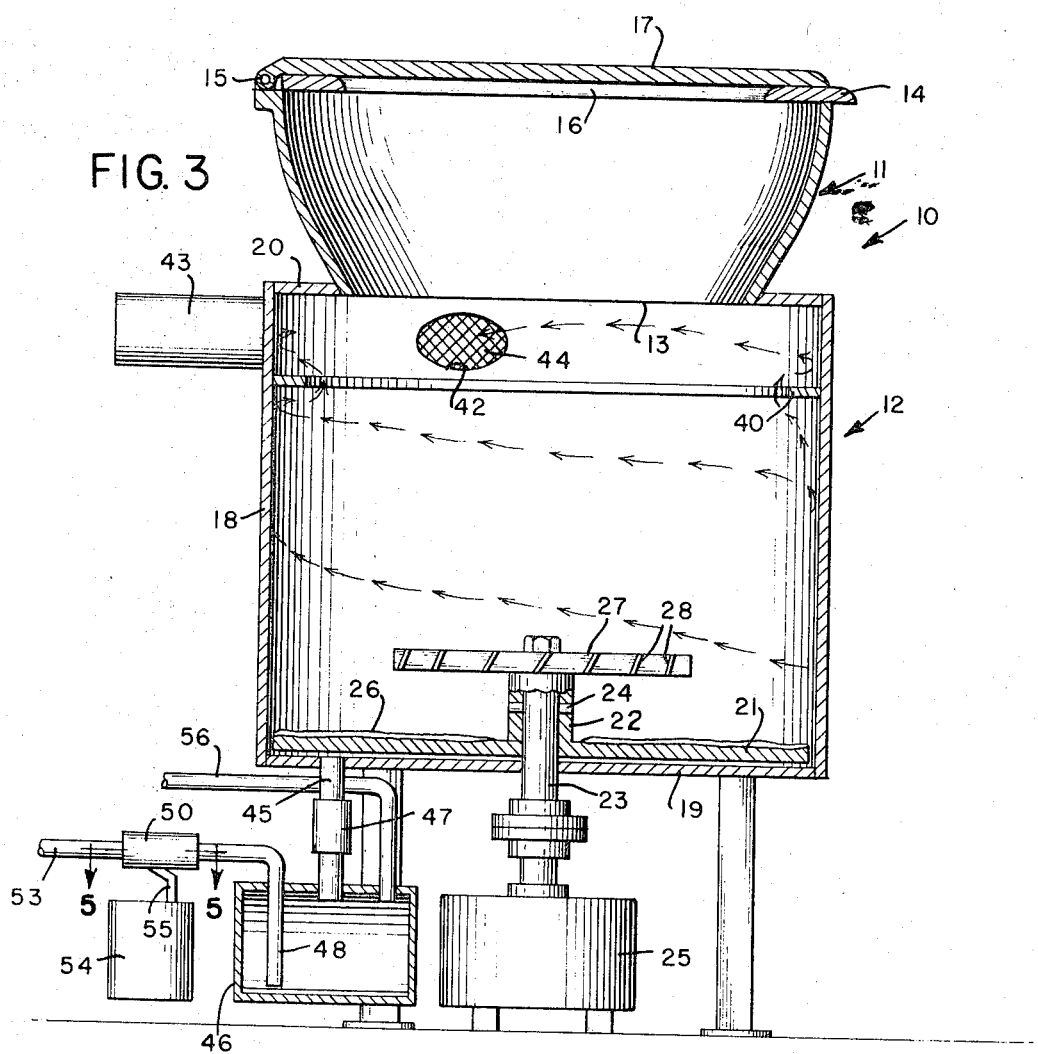
FIG. 3 is a section on the line 3—3 of FIG. 2.

Preferably the disk 21 is rotated at a relatively high speed, such as approximately 4,000 r.p.m., and this can be accomplished either by a direct drive from a high speed motor, as illustrated in FIGS. 1 and 3, or if desired by a lower speed motor utilized to drive gearing (not shown) which in turn drives the disk at the desired speed. The upper surface of the disk 21 is roughened in any desired manner, as by a series of generally radial welded beads 26 which will comminute solid matter coming in contact therewith and will throw the comminuted particles outwardly against the side wall 18 by centrifugal action when the disk is rotated. At the upper end of the hub 22 a turbine wheel 27, having a plurality of generally radial blades 28, is mounted on the shaft 23. The wheel 27 is rotated by the shaft 23 to assist in propelling the comminuted waste material outwardly and the blades 28 are pitched to draw air downwardly into the center of the lower compartment for a purpose which will be described later.

In order to incinerate and dispose of the comminuted material, an inlet line 30 is arranged generally tangentially of the side wall 18 and located slightly above the comminuting disk 21. Such inlet line is in communication with the interior of the lower compartment 12 through an opening 31. Air under pressure from a suitable source (not shown) is forced through a supply line 32 and a venturi 33 having a tapered high pressure portion 34, a constricted throat 35 and a tapered discharge portion 36. When air under pressure is forced through the constricted throat 35, the velocity of such air will be accelerated, while the pressure will be reduced in direct proportion to each other so that a negative pressure or partial vacuum will be created within the discharge portion 36.

A fuel line 37 connected to a tank 38 containing combustible liquid fuel is in communication with the discharge portion 36 adjacent to the constricted throat 35 of the venturi so that the negative pressure or partial vacuum will draw fuel from the tank and discharge such fuel into the discharge portion 36 where it is atomized and mixed with the air passing through the venturi. The mixture of air and fuel is discharged into the inlet line 30 where such mixture is ignited by heat from a sparkplug or glow plug 39 and the resulting flame is projected into the lower compartment generally tangentially in the area of the upper surface of the disk 21. It is noted that the fuel tank 38 normally is located below the venturi 33 so that ignition will stop as soon as the flow of air under pressure through the venturi is interrupted. If desired, an electric preheater coil 37' may be located adjacent to the fuel line 37 to increase the volatility of low volatile fuels such as fuel oil and the like.

The downdraft of air in the center of the combustion chamber caused by the turbine wheel 27 is directed outwardly against the lower inner periphery of the combustion chamber to supply additional oxygen for compustion and simultaneously to cause the flame to swirl and increase its intensity of heat. Thereafter the flow of air will move upwardly in an updraft along the side wall 18. Due to the updraft, as well as the tendency of warm air to rise, the projected flame and heat will move upwardly in a helical path around the inner periphery of the lower compartment until it reaches a baffle ring 40 extending inwardly from the side wall 18. The baffle ring 40 directs the flow of air toward the center of the combustion chamber and then over the inner edge of the baffle and upwardly to the upper portion of the combustion chamber. Larger portions of ash and waste matter, such as paper or the like, which are still burning and which are caught in the updraft, will be carried by eddy currents associated with the baffle ring 40 toward the central portion of the combustion chamber where such material will be caught in the downdraft caused by the turbine wheel 27 and will be returned to the lower portion of the chamber.

Within the area between the baffle ring 40 and the upper wall 20, an auxiliary air inlet line 41 is adapted to introduce air under pressure from any desired source (not shown) generally tangentially of the inner periphery of the combustion chamber. The flow of air from the auxiliary air inlet line 41 will cause the heated air above the baffle ring 40 to travel in a circular path and cause the heated air to be exhausted through an opening 42 into a flue 43. If desired a screen 44 can be disposed across the opening 42 to prevent pieces of burning matter from being discharged through the flue.

Figure 5:
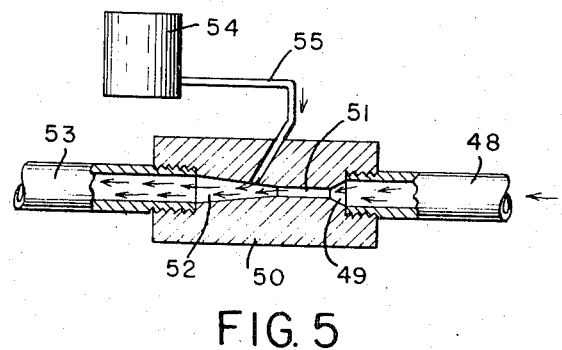
FIG. 5 is an enlarged section on the line 5—5 of FIG. 3.

As illustrated in FIGS. 1, 3 and 5, liquid waste introduced into the lower compartment 12 will flow around the outer periphery of the disk 21 onto the bottom wall 19. Such bottom wall preferably has a slight drainage pitch to direct the liquid waste to a drain 45. One end of the drain is connected to the bottom wall 19 and communicates with the interior of the lower compartment and the opposite end of such drain communicates with a sump 46. Intermediate its ends the drain 45 is provided with a one-way check valve 47 which permits free flow of fluid in one direction but prevents flow of fluid in the opposite direction.

The sump 46 may be of any desired size, although a sump having a capacity of approximately one pint has been found satisfactory. A discharge pipe 48 projects through the sump 46 and one open end of such pipe terminates adjacent to the bottom of the sump. The opposite end of such discharge pipe is connected to a high pressure portion 49 of a venturi 50. The venturi 50 includes a constricted throat 51 providing communication between the high pressure portion 49 and a tapered frusto-conical discharge portion 52 which in turn is connected to a vet pipe 53. A tank 54 containing liquid chlorine or other neutralizing agent is located adjacent to the venturi 50 and is connected to the discharge portion 52 by a suction tube 55. Fluid forced through the constricted throat 51 will create a negative pressure or partial vacuum within the discharge portion 52 of the venturi and will draw liquid chlorine from the tank 54 into the discharge portion 52 and entrain such chlorine within the fluid being discharged. The chlorine will destroy bacteria in the liquid waste matter so that the chlorinated matter can be discharged without harmful after effects.

In order to discharge the liquid waste from the sump 46, an air line 56 is provided having one end communicating with the interior of the sump 46 and the opposite end connected to a source of air under pressure (not shown). When it is desired to empty the sump, air under pressure is forced through the air line 56 into the sump and the build-up of air pressure within the sump will close the check valve 47 to prevent the escape of air pressure through the drain 45. The pressure above the liquid within the sump 46 will force such liquid downwardly into the discharge pipe 48 and through the venturi 50.

If desired the burning of the solid waste matter and the discharging of liquid waste matter preferably is accomplished within a specified time period which can be controlled by conventional time control elements (not shown). Also if desired a safety switch could be provided on the seat 14 or on the upper portion of the upper compartment 11 and activated by the cover or lid 17 in such a manner that the incinerating and treating of the waste material can only be accomplished when the cover 17 is in closed position.

In the operation of the device solid and/or liquid waste matter is introduced into the upper compartment 11 after the cover 17 has been raised, and from the upper compartment such material is discharged into the lower compartment 12. Solid waste matter is received on the grinding or comminuting plate 21 while liquid waste matter is discharged through the drain 45 into the sump 46. When the motor 25 is operated, the disk 21 rotates at a rapid rate so that the beads 26 of the roughened upper surface engage the solid waste matter and comminute the same into particulate size which will be thrown by centrifugal action against the side wall 18 of the lower compartment. Larger pieces of solid waste matter which are thrown by centrifugal action against the side wall 18 will bounce back onto the disk 21 to be further comminuted by the beads 26. Simultaneously air under pressure is forced through the supply line 32 and the venturi 33 into the inlet line 30, and as such air passes through the venturi, it mixes with fuel from the fuel tank 38. The mixture of air and fuel is ignited by the source of heat 39 and the resulting flame is projected into the lower compartment 12 generally tangentially of the lower inner periphery thereof. The flame from the inlet line 30 extends substantially entirely around the inner periphery of the combustion chamber and normally is confined to the area between the comminuting disk 21 and the turbine wheel 27. The heat and products of combustion travel in a helical path up the inner periphery of the lower compartment 12 until they encounter the baffle ring 40. Burning ash and other waste matter are directed into the central portion of the combustion chamber where they are caught in the downdraft created by the turbine 27 and returned to the lower portion of the combustion chamber where they are again subjected to the flame. The hot air, burned ash and other products of combustion bypass the baffle ring 40 and are discharged through the flue 41. The operation continues until the solid waste is incinerated after which the introduction of the fuel mixture is halted. Thereafter the motor 25 continues to operate for a limited time so that the blade members 28 can circulate air around the lower compartment to cool the same.

The liquid waste matter which has been discharged into the sump 46 can be discharged by introducing air under pressure into the sump through the air line 56 which will cause a build-up of pressure within the upper portion of the sump and force such liquid out through the discharge pipe 48, the venturi 50 and the vent pipe 53. When the liquid is being forced through the venturi 60, chlorine or other neutralizing agent from the tank 54 will be entrained in such liquid to destroy the bacteria therein.

I claim:

1. An incinerator toilet comprising wall structure defining a generally cylindrical combustion chamber, means for introducing a combustible mixture into said chamber under pressure, means for igniting said combustible mixture, means for directing the ignited mixture in a swirling burning path around the inner surface of said wall structure, and means for forcibly projecting matter to be treated against the inner surface of said wall structure in contact with said burning mixture to incinerate said matter.

2. Apparatus for disposing of waste matter comprising wall structure forming a generally cylindrical combustion chamber having an opening for the introduction of matter thereinto, means within said combustion chamber for directing the matter introduced into said chamber toward said wall structure, means for supplying fuel and sufficient air under pressure into said chamber to support combustion, means for igniting said mixture, means for directing the resulting flame generally tangentially along the inner surface of said wall structure in a swirling burning generally circumferential manner in the path of the matter directed toward said wall structure to incinerate said matter.

3. The structure of claim 2 in which said means for directing matter toward said wall structure includes comminuting means for reducing the size of solid waste matter.

4. The structure of claim 2 in which said means for supplying fuel and sufficient air to support combustion includes inlet pipe means supplied with air under pressure, venturi means having pressure and discharge portions located in said inlet pipe means, fuel tank means communicating with the discharge portion of said venturi means, whereby air under pressure passing through said venturi means will entrain fuel therein to form a combustible mixture which is introduced through said inlet pipe means into said chamber.

5. The structure of claim 2 including flue means communicating with the interior of said combustion chamber and generally tangentially thereof for discharging heat and products of combustion from said chamber.

6. The structure of claim 2 including sump means located exteriorly of said combustion chamber, drain means providing communication between said sump means and said combustion chamber for receiving liquid waste matter from said chamber, selectively operable discharge pipe means connected to said sump means and means for entraining a neutralizing agent within the liquid waste matter being discharged through said discharge pipe means, whereby liquid waste matter will be neutralized and discharged from said apparatus.

7. The structure of claim 2 including means for producing a downdraft substantially centrally of said combustion chamber.

8. An incinerator toilet comprising wall means forming a generally cylindrical combustion chamber having an opening for receiving waste matter, centrifugal means located in said chamber in the path of waste matter entering said chamber to direct said waste matter toward said wall means, and burner means for forcing a burning stream of fluid into said chamber tangentially of said wall means to form a swirling stream of burning fluid and waste matter in said chamber.

9. The apparatus of claim 8, in which said centrifugal means is disposed in said chamber at a location spaced from said opening, in which said burner means is located between said centrifugal means and said opening, and further comprising a perforated exhaust port in said wall means between said burner means and said opening for discharging combustion products and ashes from said chamber.

10. The apparatus of claim 8 in which said centrifugal means comprises a comminuting disk, projections on said disk confronting said opening to engage and disrupt solid waste matter and direct it toward said wall means, and motor means for rotating said disk.

11. Apparatus for treating waste matter comprising upper and lower compartments in communication with each other, seat means having a central opening mounted on said upper compartment, cover means pivotally mounted on said upper compartment and adapted to selectively close the opening of said seat means, said lower compartment including a combustion chamber having a generally cylindrical side wall and a bottom wall, a comminuting plate located within said chamber adjacent to said bottom wall, the upper surface of said comminuting plate being roughened to cause disintegration of solid waste matter, means for rotating said plate to comminute solid waste matter and project the same against the inner periphery of said side wall by centrifugal action, an inlet line communicating with the interior of said chamber and generally tangentially thereof adjacent to said comminuting plate, venturi means disposed along said inlet line, means for introducing air under pressure through said venturi means, means connecting a tank of combustible fuel to said venturi means so that air under pressure passing through said venturi will draw fuel from said tank and provide a combustible mixture, means for igniting said combustible mixture, and flue means located generally tangentially of said lower compartment for discharging heat and products of combustion therefrom.

12. The structure of claim 11 including drain means in said bottom wall, said drain means being in communication with a sump for receiving liquid waste matter from said combustion chamber, means for introducing air under pressure into said sump, discharge pipe means for discharging liquid waste matter from said sump, said discharge pipe means connecting said sump to a venturi having a constricted throat and a discharge portion, means for entraining a neutralizing liquid within the liquid waste matter being discharged through the discharge portion of said venturi, whereby liquid from said sump will be discharged through said venturi where such liquid will be neutralized.

References Cited
UNITED STATES PATENTS

| | | | |
|---|---|---|---|
| 656,194 | 8/1900 | Janney | 4—118X |
| 966,704 | 8/1910 | Pickles | 110—9 |
| 1,290,615 | 1/1919 | McGary | 4—131 |
| 1,818,586 | 8/1931 | Schumacher | 4—118 |
| 1,957,855 | 5/1934 | States | 110—9 |
| 1,996,325 | 4/1935 | Cox | 4—131 |
| 2,376,938 | 5/1945 | Potter | 110—9 |
| 2,678,450 | 5/1954 | Simpson et al. | 4—10 |
| 2,732,564 | 1/1956 | Potts | 4—131 |
| 2,768,386 | 10/1956 | Graef et al. | 4—131 |
| 2,771,533 | 11/1956 | Osberg et al. | 4—131X |
| 2,882,534 | 4/1959 | Jauch et al. | 4—131 |
| 2,995,097 | 8/1961 | Kruckeberg et al. | 110—9 |
| 3,092,049 | 6/1963 | Wood | 110—9 |
| 3,103,017 | 9/1963 | La Mere | 4—110 |
| 3,111,684 | 11/1963 | Cole | 4—131 |
| 3,139,626 | 7/1963 | Blankenship | 4—131 |
| 3,266,552 | 8/1966 | Denis | 110—9X |
| 3,319,588 | 5/1967 | Duncan | 110—9 |
| 3,323,473 | 6/1967 | Frankel | 110—9 |
| 3,431,563 | 3/1969 | Rascov | 4—1 |
| 3,436,765 | 4/1969 | Sundberg | 4—131 |

LAVERNE D. GEIGER, Primary Examiner

H. K. ARTIS, Assistant Examiner

U.S. Cl. X.R.

110—9